United States Patent [19]

Fujimura

[11] Patent Number: 4,541,330

[45] Date of Patent: Sep. 17, 1985

[54] METHOD OF AND APPARATUS FOR SEPARATING WHITE FROM YOLK OF AN EGG

[75] Inventor: Gen Fujimura, Tokyo, Japan

[73] Assignee: Kewpie Kabushiki Kaisha, Tokyo, Japan

[21] Appl. No.: 571,489

[22] Filed: Jan. 17, 1984

[30] Foreign Application Priority Data

Dec. 6, 1983 [JP] Japan ............................. 58-230436

[51] Int. Cl.⁴ ............................................. A23J 1/09
[52] U.S. Cl. ........................................ 99/500; 99/497
[58] Field of Search ................................. 99/495–500, 99/568, 577–582; 426/490, 614, 478–480

[56] References Cited

U.S. PATENT DOCUMENTS 4,111,111 9/1978 Willsey ............................ 99/500 X

FOREIGN PATENT DOCUMENTS 526245 9/1940 United Kingdom .................. 99/500

Primary Examiner—Timothy F. Simone
Attorney, Agent, or Firm—Oblon, Fisher, Spivak, McClelland & Maier

[57] ABSTRACT

An egg processing unit is supported by a conveyor and has an egg breaking assembly for breaking the egg-shell of an egg and a separating cup for separating the white of the egg from the yolk thereof. The separating cup is supported by a supporting arm held by the conveyor. The separating cup has a V-shaped escape opening causing the white to overflow and is swingable, in accordance with the natures of the egg to be processed, about a pivot axis extending in a direction perpendicular to the moving direction of the separating cup.

6 Claims, 5 Drawing Figures

METHOD OF AND APPARATUS FOR SEPARATING WHITE FROM YOLK OF AN EGG

BACKGROUND OF THE INVENTION

This invention relates to a method of and an apparatus for separating the white or albumen from the yolk of an egg by using a separating cup which receives the contents of an egg from an egg breaking assembly for breaking the egg-shell of the egg.

Conventional automatic egg breaking apparatuses are, for example, disclosed in U.S. Pat. No. 4,321,864 and U.S. Pat. No. 4,137,838, in each of which there is provided a movable endless conveyor which has a plurality of egg breaking assemblies for breaking egg-shells and a plurality of separating cups each forming a pair with a corresponding one of the assemblies. Each egg is held by a corresponding assembly and the contents of the egg broken by the assembly drop into a corresponding separating cup. Each separating cup has an arcuate escape opening for causing the white of the egg to overflow, leaving the yolk in the cup. The overflowed white is received by an albumen bowl located under the separating cup. The separated yolk and white are recovered separately into respective recovery tanks.

Each separating cup remains horizontally when it receives the contents of a broken egg and is inclined toward the recovery tank when only the yolk is recovered. That is, each separating cup is so supported on the moving endless conveyor as to take only two positions for receiving the contents of an egg and recovering the yolk left in the separating cup.

However, in case wherein an egg to be processed is fresh, its white cannot be easily separated from its yolk. In case wherein the yolk of an egg to be processed is small, the white cannot easily overflow beyond the escape opening of the separating cup because the upper face of the yolk accommodated in the bottom portion of the cup lies in a relatively lower position with respect to the escape opening. In these cases, a part of the white is apt to be left in the separating cup with the yolk. Accordingly, the white-yolk separation ability of the cup is reduced, so that the yolk mixed with the white is recovered.

In case wherein an egg to be processed is not fresh or stale, the yolk is apt to flow out of the escape opening together with the white because of its high liquidity or fluidity. Furthermore, in case wherein the yolk of an egg to be processed is bigger than normal one, a part of the yolk is likely to overflow the escape opening. This results in the reduction of recovery rate of the yolk.

In addition, as the escape opening of each conventional separating cup is arcuately formed, the white suspended from the escape opening cannot be cut sharply or clearly when the white has completely overflowed. This may cause the white suspended from the opening to bring a part of the yolk out of the separating cup together therewith.

These defects much influence adversely the separation ability for an egg breaking apparatus, especially when it is operated at a high speed. At present, there has been proposed a high speed egg breaking apparatus which can break approximately 600 eggs per minute. This kind of egg breaking apparatus especially requires a separating cup having a high separation ability.

SUMMARY OF THE INVENTION

It is an object of this invention to provide a method of and an apparatus for separating the white from the yolk of an egg in which its separation ability can remain high even when a variety of eggs different from each other in volume and freshness are processed whereby the pure yolk of an egg which is not mixed with the white can be recovered completely.

According to one aspect of this invention, there is provided a method of separating the white of an egg from the yolk thereof by a separating cup which is provided with an escape opening causing the white to overflow, said method comprising the steps of: setting an inclination angle of the separating cup, corresponding to the specific character of an egg to be processed, in order to cause only the white to overflow the escape opening formed in the backward or forward portion of a side wall of the cup in the moving direction thereof, said cup being supported by a supporting member in such a manner that the separating cup can be swung about an axis extending perpendicular to the moving direction of the separating cup in order to face the escape opening upward or downward; breaking the egg by an egg breaking assembly located over the separating cup to drop the contents of the egg into the separating cup; and causing the white of the egg to overflow the escape opening.

According to another aspect of this invention, there is provided an apparatus for separating the white of an egg from the yolk thereof, said apparatus comprising: a separating cup for receiving contents of an egg broken by an egg breaking assembly in order to separate the white of the contents from the yolk thereof, said separating cup having an escape opening, formed in the forward or backward portion of a side wall of the cup in the moving direction, over which the white flows with the yolk remaining in the separating cup; a supporting member for supporting the separating cup so that the cup can swing about a pivot axis extending in a direction perpendicular to the moving direction of the separating cup, said supporting member being pivotally held, at its lower part, by a conveyor for moving the separating cup and the egg breaking assembly at the same time; and an adjusting lever for swinging the separating cup to set the inclination angle of the separating cup.

The nature, utility, and further features of this invention will be more clearly apparent from the following detailed description with respect to preferred embodiments of the invention when read in conjunction with the accompanying drawings briefly described below.

DETAILED DESCRIPTION OF THE INVENTION

Figure 1:
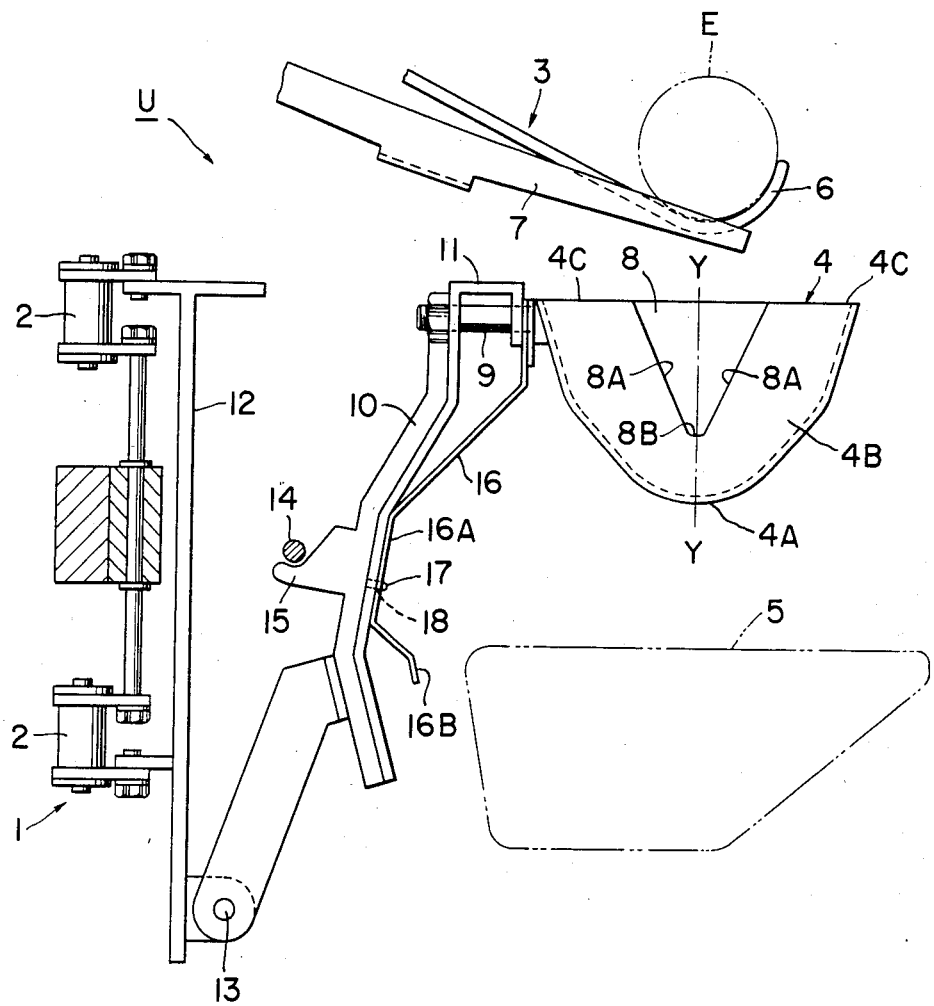
FIG. 1 is a side elevation of an egg processing unit showing its schematic construction according to this invention.

FIG. 1 shows one of egg processing units U which are supported by a conveyor 1. The conveyor 1 has two endless chains 2, 2 spaced apart from each other in vertical direction. The endless chains 2, 2 are horizontally moved by a plurality of sprockets (not shown) along a specific path (also not shown).

Each egg processing unit has an egg breaking assembly 3 for breaking an egg-shell, a separating cup 4 for separating the white or albumen from the yolk thereof, and an albumen bowl 5 for receiving the white dropped from the separating cup 4. These three members 3, 4, 5 are supported by the conveyor 1 and moved along the path at the same time. Furthermore, these three members 3, 4, 5 are located in vertically aligned positions.

Figure 2:
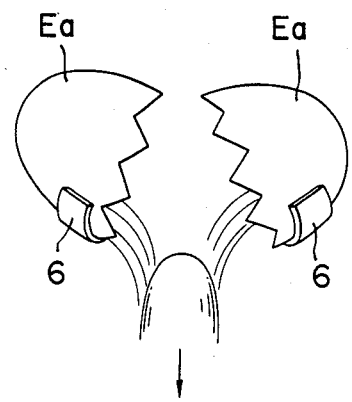
FIG. 2 is a front elevation of a separating cup of the egg processing unit shown in FIG. 1.

The egg breaking assembly 3 is well known, for example, as disclosed in U.S. Pat. No. 4,137,838. An egg E is held by two holding arms 6, 6 spaced apart from each other in the lateral direction. Between the two holding arms 6, 6 (only one of the arms 6, 6 is shown in FIG. 1) is provided a cutting blade 7 which is swingable in the vertical direction. When each egg processing unit U reaches a predetermined position, the cutting blade 7 is swung to the upper direction so as to break the egg-shell of the egg E supported on the holding arms 6, 6. At this time, the two holding arms 6, 6 are opened in the lateral direction as shown in FIG. 2 so that the contents of the egg E can drop into the separating cup 4 from two divided egg shells Ea,Ea.

The separating cup 4 has a closed bottom portion 4A which is shaped or formed to maintain the natural configuration of the yolk sac. The separating cup 4 is of sufficient dimensions to accommodate the yolk sac which tends to settle the same to the bottom of the cup 4 and pushes the albumen upwardly. The periferal side wall 4B of the cup 4 curves upwardly and outwardly towards the generally circular top rim 4C. The side wall 4B is provided with a V-shaped escape opening 8 at its backward position in the moving direction of the egg processing unit U.

Figure 4:
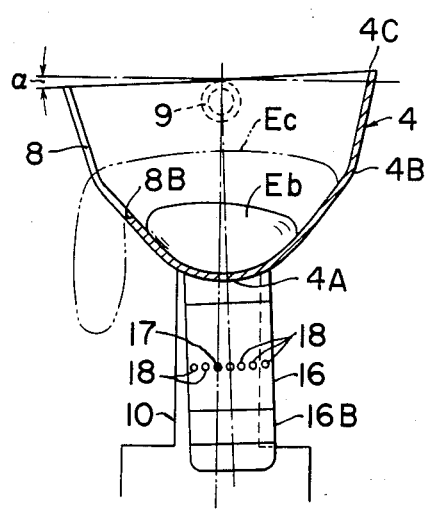
FIG. 4 is a front elevation of the separating cup in vertical section showing a state wherein the cup is inclined in one direction.
Figure 5:
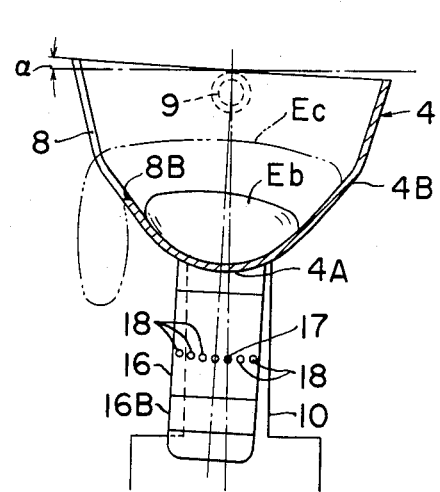
FIG. 5 is a front elevation of the separating cup in vertical section showing a state wherein the cup is inclined in the direction opposite to that of FIG. 4.

The lower edge 8B of the escape opening 8 is located in a position slightly lower than the upper surface of the yolk sac Eb as shown in FIGS. 4 and 5 so that the albumen of the egg E can completely drop into the albumen cup 5 through the escape opening 8. The escape opening 8 opens upwardly and is defined by two inclined edges 8A, 8A which are symmetric with respect to a center line Y—Y as shown in FIG. 1.

The cup 4 has a pivot axis 9 which is pivotally engaged with the upper portion 11 of a supporting arm 10. The lower end of the supporting arm 10 is pivotally attached, by a pivot pin 13, to the lower end of a supporting frame 12 which is held on the endless chains 2, 2. At the intermediate portion of the supporting arm 10 is formed an engaging hook 15 which is engaged with a guide rail 14. The rail 14 is provided along the moving path of the conveyor 1. However, the rail 14 is partially cut away in the position where the yolk in the separating cup 4 and the white in the albumen bowl 5 are recovered into their respective recovery tanks. That is, when the egg processing unit U is moved in a state wherein the engaging hook 15 slides on the lower surface of the guide rail 14, the separating cup 4 and the albumen bowl 5 are held in their respective horizontal positions. However, when the unit U comes to an egg recovery position where the rail 14 is partially cut away as mentioned above, the supporting arm 10 swings clockwise (in FIG. 1) due to the weight of the cup 4, bowl 5, etc. about the pivot pin 13, whereby the separating cup 4 and the albumen bowl 5 fall down to discharge the yolk and white toward the respective recovery tanks.

To the root portion of the pivot axis 9 is fixed, by means of welding, mechanical setting or the like, the upper end of an adjusting lever 16 which is made of an elastic material. The adjusting lever 16 extends downwardly along the supporting arm 10 and has an abutting or adjusting portion 16A, in its intermediate position, which elastically abuts against the outer surface of the supporting arm 10. At the lower end of the lever 16 is formed an operating portion 16B which extends outwardly from the supporting arm 10 so that an operator can easily hold it when the lever 16 is operated.

Figure 3:
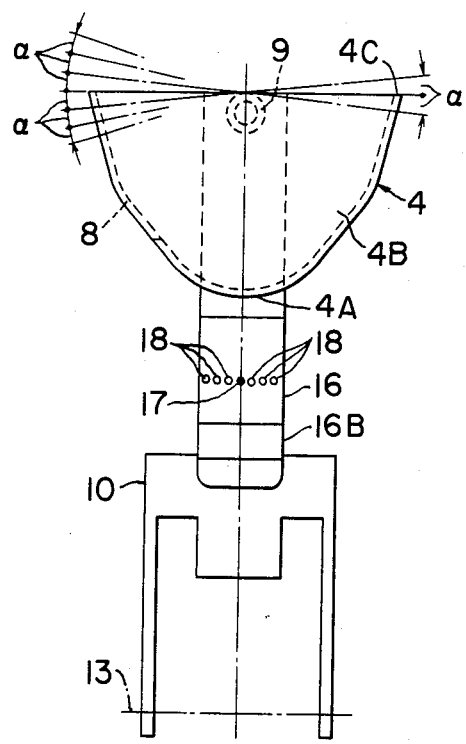
FIG. 3 is a front view showing a state wherein an egg-shell is broken by an egg breaking assembly.

A small projection 17 is formed on a portion of the supporting arm 10 corresponding to the abutting portion 16A of the lever 16 and is located in the center position in the transverse direction of the supporting arm 10 while a plurality of small holes 18, 18, . . . 18 are formed in the adjusting lever 16. These holes are disposed at equal intervals along an arc of a circle whose center is the pivot axis 9. One of these holes 18 can be engaged with the projection 17 to hold the separating cup 4 at a predetermined angular position about the pivot axis 9 as shown in FIG. 3. That is, the separating cup 4 can be selectively inclined in the upward and downward direction about the pivot axis 9 in order to adjust the position of the escape opening 8.

When an operator requires to adjust the angular position of the escape opening 8 with respect to the pivot axis 9, he picks up the operating portion 16B of the lever 16 to engage the selected hole 18 with the projection 17 while rotating the separating cup 4 about the pivot axis 9.

The distance between the adjoining holes 18, 18 is so determined that the inclination angle of the cup 4 may be changed at a pitch $\alpha$, for example, the pitch $\alpha$ of 2.5 degree. Furthermore, the projection 17 may be provided on the adjusting lever 16 while the holes 18 may be provided in the supporting arm 10. In addition, in FIG. 1, the adjusting lever 16 is formed outward of the supporting arm 10 (on the right side of the supporting arm 10), whereas the lever 16 may be formed inside of the arm 10 (on the left side thereof).

The operation of the apparatus according to this invention is as follows.

When an egg E is broken by the egg breaking assembly 3 and the contents of the egg E drop into the cup 4, the yolk Eb is received in the bottom portion 4A while the white Ec is located upward of the yolk Eb, as shown in FIGS. 4 and 5 based on the difference in specific gravity between them. The white Ec overflows out of the V-shaped escape opening 8. At this time, as the upper part of the V-shaped opening 8 is opened widely, the upper portion of the white Ec immediately begins to flow out of the opening 8 and the lower portion thereof gradually overflows. At last, the dense white of the egg contents surrounding the periphery of the yolk Eb overflows through the opening 8. However, the dense white passes the narrow space in the lower end of the opening 8. Accordingly, there is no fear for the dense white of drawing together with the egg yolk Eb out of the opening 8. Moreover, when the dense white has completely overflowed, it passes through a space where the two inclined edges 8A, 8A will converge together to sharply cut the dense white along the inclined edges 8A, 8A whereby all the white Ec can be completely separated from the yolk Eb.

In this example, as the escape opening 8 of each separating cup 4 is formed in the backward wall thereof in the moving direction of each egg processing unit U, the white Eb can overflow smoothly due to the inertia force exerted on the white Eb.

The eggs to be processed have a variety of natures, for example, fresh or stale eggs or eggs with small or big yolks.

When the fresh eggs or eggs with small yolks are processed, each separating cup 4 is swung counter-clockwise in FIG. 3. That is, the operator picks up the operating portion 16B of the adjusting lever 16 to engage the projection 17 with a selected hole 18, such as shown in FIG. 4, so that the separating cup 4 takes an inclined position suitable for the eggs to be processed.

Thus, the lower end of the escape opening 8 is lowered and the opening 8 faces slightly downward. Accordingly, in the case where an egg with a small yolk is processed, the upper face of the yolk lies in a suitable position with respect to the escape opening 8. In addition, even when the white Ec adheres strongly to the yolk Eb, the white Eb immediately begins to overflow the opening 8 because the opening 8 is lowered from the standard position as shown in FIG. 3.

On the contrary, when the stale eggs or eggs with large yolks are processed, each separating cup 4 is rotated in the opposite direction as shown in FIG. 5 so that the opening 8 faces slightly upward. At this time, the lower end of the opening 8 rises over its standard position as shown in FIG. 3. Accordingly, even in the case of the white Ec of an egg having a high fluidity or liquidity, its overflow can relatively be restrained whereby the yolk Eb which is apt to collapse easily because it is not fresh is prevented from being drawn out of the opening 8 together with the white Ec. In addition, even when the yolk Eb is large, only the white Ec can overflow without drawing together with the yolk Eb out of the opening 8 because the opening 8 rises over the standard position.

The separated white Ec is dropped into the albumen bowl 5 and is recovered into the recovery tank. The remaining yolk Eb in the cup 4 is also recovered into the recovery tank different from that for the white Ec at a position in the moving path of the conveyor 1 where the guide rail 14 is partially cut away. In this recovery position, as the engaging hook 15 of the supporting arm 10 is released from the guide rail 14, the cup 4 falls down to discharge the yolk Eb into the recovery tank.

According to this invention, the inclination angle of each separating cup 4 is so determined that a selected hole 18 is engaged with the projection 17 on the supporting arm 10 to change the relative position between the adjusting lever 16 and the supporting arm 10. Accordingly, the determination of the inclination angle can be done simply and easily with high reliability. Moreover, the determined inclination angle of the cup 4 is not changed unexpectedly during its egg breaking and separating operation. This invention is suitable for a high speed egg breaking apparatus which requires a high ability for separating the albumen from the yolk of an egg and for recovering pure yolk of an egg.

What is claimed is:

1. An apparatus for separating the white of an egg from the yolk thereof while the apparatus is moving on a high-speed automatic egg-breaking machine, said apparatus comprising:
   (a) a separating cup for receiving the contents of an egg broken by an egg breaking assembly in order to separate the white of the contents from the yolk thereof, said separating cup having an escape opening formed in a portion of a side wall of said separating cup which is the back wall of said separating cup with respect to the direction of motion of said separating cup, said escape opening being sized, shaped, and positioned so that the white flows out of said separating cup through said escape opening while the yolk remains in said separating cup;
   (b) a supporting member for supporting said separating cup so that said separating cup can swing in its direction of motion about a horizontal pivot axis perpendicular to its direction of motion, said supporting member being pivotally held, at its lower part, by a conveyor for moving both said separating cup and the egg breaking assembly at the same time; and
   (c) an adjusting lever extending along said supporting member for swinging said separating cup to set the inclination angle of the cup in its direction of motion, said adjusting lever being elastically biased so that its middle portion elastically abuts against the adjacent surface of said supporting member, the middle portion of said adjusting lever being releasably connectable to said supporting member in a plurality of different angular positions, the lower portion of said adjusting lever forming an operating portion which extends outwardly from said supporting member so that an operator can easily manipulate the lower portion of said adjusting lever so as to connect the middle portion of said adjusting lever to said supporting member at an inclination angle selected as a function of the characteristics of the eggs being broken.

2. An apparatus according to claim 1, wherein:
   (a) said escape opening is V-shaped with the bottom of the V pointing downwardly and
   (b) the bottom portion of said separating cup is adapted to accommodate the yolk of the egg with the white thereof located over the yolk and the upper face of the white being positioned slightly upwardly of the lower end of said escape opening.

3. An apparatus according to claim 1, wherein:
   (a) a projection is provided on one of said adjusting lever and said supporting member and
   (b) the other one of said adjusting lever and said supporting member has a plurality of holes which are sized, shaped, and positioned to receive said projection for selectively connecting said adjusting lever to said supporting member.

4. An apparatus for separating the white of an egg from the yolk thereof while the apparatus is moving on a high-speed automatic egg-breaking machine, said apparatus comprising:
   (a) a separating cup for receiving the contents of an egg broken by an egg breaking assembly in order to separate the white of the contents from the yolk thereof, said separating cup having an escape opening formed in a portion of a side wall of said separating cup which is the back wall of said separating cup with respect to the direction of motion of said separating cup, said escape opening being sized, shaped, and positioned so that the white flows out of said separating cup through said escape opening while the yolk remains in said separating cup;

(b) a supporting member for supporting said separating cup so that said separating cup can swing in its direction of motion about a horizontal pivot axis perpendicular to its direction of motion, said supporting member being pivotally held, at its lower part, by a conveyor for moving both said separating cup and the egg breaking assembly at the same time; and (c) an adjusting lever extending along said supporting member for swinging said separating cup to set the inclination angle of the cup in its direction of motion, the middle portion of said adjusting lever being releasably connectable to said supporting member in a plurality of different angular positions, the lower portion of said adjusting lever forming an operating portion which extends outwardly from said supporting member so that an operator can easily manipulate the lower portion of said adjusting lever so as to connect the middle portion of said adjusting lever to said supporting member at an inclination angle selected as a function of the characteristics of the eggs being broken.

5. An apparatus according to claim 4, wherein:
(a) said escape opening is V-shaped with the bottom of the V pointing downwardly and
(b) the bottom portion of said separating cup is adapted to accommodate the yolk of the egg with the white thereof located over the yolk and the upper face of the white being positioned slightly upwardly of the lower end of said escape opening.

6. An apparatus according to claim 4, wherein:
(a) a projection is provided on one of said adjusting lever and said supporting member and
(b) the other one of said adjusting lever and said supporting member has a plurality of holes which are sized, shaped, and positioned to receive said projection for selectively connecting said adjusting lever to said supporting member.

* * * * *